Dec. 16, 1958  R. KOBLER  2,864,891
CONTROL SYSTEM FOR DICTATING MACHINES
Filed May 29, 1957
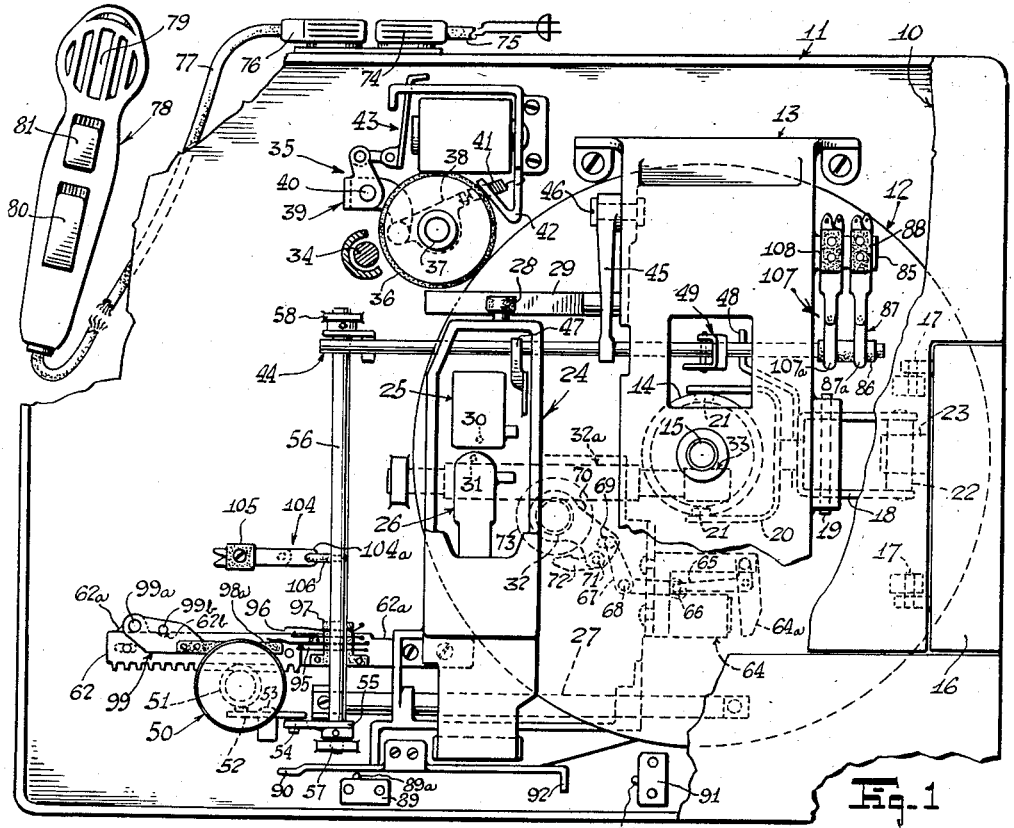
Fig. 1
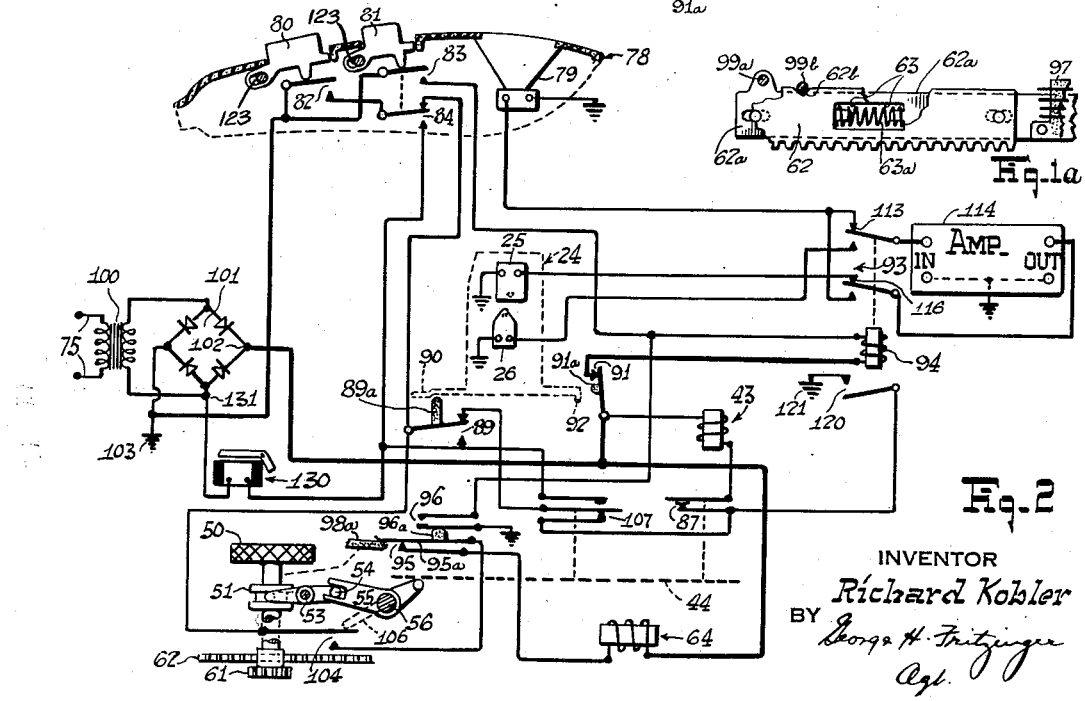
Fig. 1a
Fig. 2
INVENTOR
Richard Kobler
BY George H. Fritzinger
Agt.

United States Patent Office 2,864,891
Patented Dec. 16, 1958

2,864,891

CONTROL SYSTEM FOR DICTATING MACHINES

Richard Kobler, West Orange, N. J., assignor to McGraw-Edison Electric Company, Elgin, Ill., a corporation of Delaware Application May 29, 1957, Serial No. 662,489

12 Claims. (Cl. 179—100.1)

This invention relates particularly to dictating machines of the type which are selectively operable also as reproducing machine either for short playback of only the last portion of one's dictation or for long playback of any or all of the recorded dictation.

The different manual controls of a dictating machine should be arranged in the most simplified manner so that a dictator can operate the machine to perform its different functions with a minimum of attention. To this end those machines which are remotely controlled only for use primarily for the recordation of dictation have been arranged so that the record and reproduce functions are performed separately by respective record and reproduce start-stop controls on the dictator's handpiece as is disclosed in the pending application of William W. Logan, Serial No. 540,370, filed October 14, 1955, now Patent No. 2,816,177, dated December 10, 1957. When the machine is to be also usable primarily for the reproduction or transcription of dictation it is necessary that it be provided with a record-reproduce conditioning control. My invention provides that when this conditioning control is in record position to condition the machine primarily for recording, short playback is produced by pressing the reproduce start control button and that when the conditioning control is in reproduce position to condition the machine primarily for reproducing, the record start control button becomes a back-spacing control for the record-reproduce head carriage. Since in these machines the recording and reproducing functions are carried out by separate control buttons, it is desirable to be able to lock these control buttons in their operated positions as whenever the machine is to be used continuously for its respective purpose.

Further different conditions in which a dictating machine may be placed and which determine its operability depend upon whether a record is mounted on the turntable or other record support, whether the record is properly secured to the turntable, whether the carriage is in its regular operative range or in the end zone of its travel, whether the machine is in record or reproduce condition when the carriage is in the end zone, etc. These many different conditions in which the machine may be placed must all be properly controlled to prevent misoperation of the machine and possible loss of dictation during the recording and reproducing processes.

An object of my invention is to provide not only a simplified control system for a dictating machine adapted to enable proper operation of the machine with a minimum of conscious effort on the part of the dictator, but also to provide the machine with a warning system which will assure an error-free operation thereof.

A particular object is to provide the machine with a warning means, preferably a sound buzzer, which will operate whenever the dictator does anything in the control of the machine which would lead to a misoperation thereof.

A further particular object is to provide a control circuitry to cause the buzzer to sound if the dictator attempts to record whenever the machine is not in a proper condition for recording.

Specific objects of my invention are to cause the warning buzzer to sound when the record button is held in operated position while any of the following conditions are also present: (1) the reproducer button is held or locked in its operated position, (2) the machine is conditioned for reproducing, (3) the carriage has reached the end of its recordation range, (4) the record is not secured to the turntable, and (5) there is no record in the machine.

Another object is to produce all of the aforestated warning signals by means of a single warning means.

Another object is to change the function of the record start button to that of a backspacing control when the machine is conditioned for reproducing.

Another object is to enable manual shifting of the reproducer head relative to the record only when the machine is in a condition for reproducing, and to couple the manual shifting means to the starting means for the machine not only to control the running of the machine by manipulation of the manual shifting means but also to assure that the machine will be in an activated reproducing condition while the reproducer head is being manually shifted relative to the record.

These and other objects and features of my invention will be apparent from the following description and the appended claims.

In the description of my invention reference is had to the accompanying drawings, of which:

Figure 1 is a fractional plan view of the mechanism of a dictating machine to which my invention has been applied;

Figure 1a is a detailed fractional view to enlarged scale of a portion of the machine; and Figure 2 is a schematic diagram of apparatus and circuits illustrating my invention.

The dictating machine fractionally shown in the figures is of the character of that fully described in the pending application Serial No. 347,875 of Richard M. Somers, filed April 10, 1953, and to which reference may be had as to details. For the present purposes, this machine need not be herein fully described. It has, for example, a housing comprising upper and lower pan-like members 10 and 11 of which the lower member serves also as a frame. Journaled to an upright boss (not shown) on the lower housing member is a horizontal turntable 12 straddled across the top from front to back by a bridge 13. In this bridge in axial alignment with the turntable is a clamping disk 14 mounted in a bearing 15 for securing a disk record to the turntable. The record is mounted via a slot in the right side of the housing, made accessible by lifting a cover 16 into a raised-open position. This cover is a section of the upper housing member hinged thereto at 17. The record clamp is spring-urged downwardly against the turntable but is raised as the cover is opened by means of a lever 18 pivoted at 19 to the bridge 13. This lever has a forked end portion 20 straddling the clamping disk and coupled thereto by pins 21 which engage slidably a peripheral groove in the clamping disk. At its opposite end the lever 18 carries a transverse roller 22 engageable by an arm 23 on the cover as the cover is opened to cam the lever to disengage the clamping disk of the turntable.

At the left side of the bridge 13 there is a carriage 24 for a recorder 25 and a reproducer 26. This carriage is mounted slidably on a transverse rod 27 at its forward end and has a roller 28 riding on a transverse rod 29 at its rearward end. The rod 29 is carried by the bridge 13. The recorder may be of the embossing type having a stylus 30 and the reproducer is provided with a corresponding stylus 31. Mounted rotatably on the carriage is a circular feed nut 32 which engages continuously with a transverse feed screw 32a. The feed nut is frictionally restrained against rotation, and the feed screw is driven by the turntable through gearing 33 so that the carriage is moved progressively to the right as the turntable is rotated. Rotation of the turntable is provided from a driving shaft 34 (driven by a suitable motor not shown) which can be coupled at will to the turntable by a clutch 35. The clutch comprises a friction wheel 36 journaled at 37 to an arm 38. This arm is pivoted at one end to a lever 39 which in turn is pivoted to a post 40 on the housing. A tension spring 41 connected to the arm 38 holds the friction wheel against the rim of the turntable as well as normally also against a stop lug 42 to hold the turntable in a braked condition. The lever 39 can, however, be turned clockwise by an electromagnet 43 to release the friction wheel from the stop lug and engage it with the driving shaft 34 to cause the turntable to be driven by the shaft.

The engagement of the recorder and reproducer with the record is controlled by a transverse lift rod 44 secured rigidly to an arm 45 pivoted at 46 to the bridge 13. Mounted on an inside wall of the carriage is a coupling mechanism 47 (only fractionally indicated) which has a finger overlying the lift rod 44 to cause the recorder and reproducer to be controlled in the following manner: When the lift rod is in its lowest position both the recorder and reproducer engage the record, when the lift rod is raised to a next higher or intermediate position only the reproducer engages the record, and when the lift rod is in its uppermost position both the recorder and reproducer are disengaged from the record. This lift rod is shifted into its uppermost position to disengage both the recorder and reproducer from the record when the record clamp is disengaged from the turntable. This is accomplished by means of a lift finger 48 on the lever 18. When the clamping disk 14 is engaged with the turntable this lift finger is lowered to place the lift rod under the influence of other control means. One of these control means is a preventive mechanism generally referred to as 49 which is engageable with the turntable to prevent the lift rod from being lowered from its uppermost position should the clamping mechanism be operated when a record is not on the turntable, this preventive mechanism being described and claimed in the pending application of Edward Dietz, Serial No. 320,025, filed November 12, 1952, now Patent No. 2,793,864, dated May 28, 1957. The purpose of this preventive mechanism is to withhold the styli from being lowered onto the turntable itself and being possibly damaged thereby.

The means for mechanically conditioning the machine for recording and reproducing comprises a control knob 50 mounted for both rotational and vertical shifting movement. This knob has a peripherally-grooved collar 51 secured to its shaft, which is engaged by a cross pin on an end of a lever 52 pivoted at its center 53 to a portion of the frame of the machine. The lever 52 has a pin-slot connection 54 at its other end to an arm 55 secured to the forward end of a front-to-back extending shaft 56 journaled at its ends in respective standards 57 and 58 upstanding from the lower housing member. Secured to the shaft of the knob 50 is a pinion gear 61 which, when the knob is lifted into reproduce position, is raised into engagement with a rack 62 yieldably mounted on an arm 62a extending leftwardly from the carriage 24. The rack has pin-slot connections to the arm to permit it to shift longitudinally thereof but is centrally biased by providing both the rack and the arm with rectangular openings 63 which are in correspondence with each other when the rack is in a midposition, and by inserting a compression spring 63a in this opening so that it bears against the edges of both the rack and the arm at opposite ends of the opening. The purpose of this yieldable lost-motion coupling between the knob 50 and carriage 24 is to permit operation of a so-called scan switch hereinafter described in further detail, but which is fully described in the pending application of Robert M. Silverman, Serial No. 583,715, filed May 9, 1956. Thus, when the knob 50 is in its reproduce position it can be turned to shift the carriage to the left or right for quick scanning of the record, but when the knob is in record position this manual scanning means is disengaged. Such manual scanning of the carriage is made possible without disengaging the circular feed nut 32 from the feed screw 32a since the frictional restraint on the feed nut can be readily overcome by the manual force applied to the knob.

Power backspacing of the carriage is carried out by recurrently activating an electromagnet 64 having an armature 64a provided with an actuating arm 65 rigidly connected thereto at one end and provided with a pin-slot connection 66 at the other end to a bell crank lever 67. This lever is pivoted to the frame at 68 and has a pin-slot connection 69 to a rocker 70 pivoted at the axis of the feed nut. Pivoted at 71 to the outer end portion of the rocker arm is a pawl 72 which is engageable with a ratchet wheel 73 concentric with and secured to the circular feed nut. Each time the electromagnet is activated the rocker arm is shifted clockwise to cause the pawl 72 to engage the ratchet wheel and turn the feed nut to shift the carriage backwardly by a small increment.

Attached by plug and jack means 74 to the machine at its rearward wall is a power cord 75 to be connected to a 110-volt power circuit, and attached by other plug and jack means 76 is a cord 77 leading to a dictator's handpiece 78. This handpiece has a head portion housing a transducer 79 operable as a microphone during recording and as a receiver during reproducing, and has separate record and reproduce start-stop buttons 80 and 81 for operating respective switches 82 and 83—84 as these buttons are depressed.

In addition to the foregoing start-stop switches the machine is provided with the following additional control switches: a normally-open transfer switch 104 comprising two switch blades supported in an insulating stack 105 and having its pole member 104a operable to a closed position by a radial pin 106 on the shaft 56 when the machine is shifted into reproducing condition; a single-pole double-throw switch 107 comprising three switch blades supported in an insulating stack 108 mounted on a side arm 85 of the bridge 13 and having the central pole member 107a overlying a portion of the lift rod 44 covered by an insulating sleeve 86 so that the switch makes with its lower contact when the lift rod is in its lowermost or record position and with its upper contact both when the lift rod is in its intermediate and uppermost positions; a normally-closed switch 87 comprising two switch blades supported in an insulating stack 88 mounted also on the side arm 85 and having its pole member 87a overlying the insulated portion 86 of the lift rod 44 so that this switch is opened only when the lift rod is in its uppermost position, a record-end switch 89 preferably of the snap type having an actuating button 89a operable by a cam 90 on the carriage when the recording stylus reaches the end of the recordable range on the record; a reproduce end switch 91 having an actuating button 91a operable by an abutment lug 92 on the carriage when the reproducer stylus (offset backwardly from the recording stylus) reaches the end of the recordable range on the record; a double-pole double-throw switch 93 for selectively conditioning the audio system for recording and reproducing operable by a record-reproduce relay coil 94 hereinafter referred to as the RR relay; and a dual switch comprising a normally-closed section 95 and a normally-open section 96 intercoupled by an insulating stud 96a and mounted in an insulating stack 97 on the carriage rack 62. The pole member 95a of the switch 95 is operable by an arm 98a of insulating material secured to a lever 99 pivoted at 99a to the carriage arm 62a. This lever has a pin 99b which engages a notch 62b in the rack 62 when the rack is in its midposition. However, whenever a driving force is applied to the rack either to the left or to the right by the turning of the knob 50 when the knob is in its reproduce position, as has been heretofore explained, the compression spring 63a coupling the rack to the carriage arm 62a will first yield and cause the pin 99b to be cammed out of the notch 62b with a resultant shifting of the lever 99 in a counterclockwise direction to cause the switch 95 to be opened and the switch 96 to be closed.

The circuit of the present control system shown in Figure 2 is supplied with power via the cord 75 and a power transformer 100. The secondary of this transformer is connected across a full-wave rectifier 101, and full-wave rectified voltage is taken from this rectifier from across the terminals 102 one of which is indicated as grounded at 103 to simplify the showing of the various return circuits of the control system.

Upon the dictator pressing the record button 80 while the machine is in recording condition shown in Figure 2, a circuit is completed from the ground 103 to the plus terminal 102 via the record start switch 82, upper contact of reproduce switch 84, upper contact of record end switch 89, bottom contact of switch 107, switch 87, and clutch electromagnet 43. The clutch is therefore actuated to start rotation of the turntable 12. Dictation spoken into the transducer 79 now acting as a microphone is converted to corresponding electrical signals and fed via upper contact of switch section 113 of the record-reproduce switch 93 to the input of an amplifier 114, and from the output of this amplifier via upper contact of switch section 116 of the record-reproduce switch 93 to the recorder 25.

If the dictator wants to listen back to the last portion of his recorded dictation over the portion represented by the distance of spacing of the reproducer 26 behind the recorder 25, he releases the record button 80 to stop the machine and then presses the reproduce button 81. This now completes a circuit from ground 103 to the plus terminal 102 via reproduce switch 83, RR relay 94, and reproduce end switch 91. The RR relay 94 is therefore operated to shift the switches 113 and 116 to their lower contacts, the effect of which is to connect the reproducer 26 to the amplifier input and to connect the amplifier output to the transducer 79 now operating as a receiver; also, it closes a switch 120 to complete a circuit from the plus terminal 102 through clutch electromagnet 43 and switch 87 to ground at 121 to cause the clutch electromagnet to be activated to start rotation of the turntable. The recorded dictation is therefore picked up by the reproducer and fed through the amplifier to the receiver 79.

When in the use of the machine for recording the recorder 25 nears the end of the record, the end switch 89 is broken from its upper contact and shifted to its lower contact by the cam 90. The opening of the upper contact interrupts the circuit of the clutch electromagnet 43 to stop the machine. However, the dictator can cause the carriage to be fed further onwardly when the machine is in reproducing condition by pressing the reproduce button 81, for in so doing the RR relay 94 is energized through the circuit abovedescribed to complete the circuit of the clutch electromagnet at the switch 120. When the reproducer 26 has reached the end of the recorded area of the record the reproduce end switch 91 is opened by pressure of the abutment lug 92 against the button 91a of the switch to interrupt the energizing circuit of the RR relay and cause the machine again to come to a standstill.

Upon the record-reproduce control knob 50 having been raised to shift the machine into reproducing condition and the dictator then pressing the reproduce button 81, the RR relay 94 is energized through the same circuit as before described, and the operation of the relay again completes the circuit of the clutch electromagnet at 120 to start the machine; however, the record button 80 is now converted to a backspacing control by the closure of the transfer switch 104 controlled by the record-reproduce knob 50. For instance, upon the dictator releasing the reproduce button 81 and pressing the record button 80, an energizing circuit for the backspacing electromagnet 64 is completed from the plus terminal 102 to ground 103 via the electromagnet 64, switch 95, switch 104, upper contact of reproduce switch 84 and record switch 82. Upon successively pressing and releasing the record button, the carriage can be stepped back by any desired amount. This backspacing can be started from the very end of the record since neither of the end switches 89 and 91 are in the backspacing circuit.

As the dictator exerts a turning force on the knob 50 while it is in its reproduce position, the switch 96 is closed as before described. This completes tthe circuit of the RR relay 94 through switch 96. Operation of this relay shifts the audio circuits into reproduce condition and closes the switch 120 to operate the clutch to start the machine. This operation of the machine while the carriage is being manually shifted is especially beneficial during backspacing because it aids the dictator in finding selected portions of previously recorded dictation by the sounds being reproduced. For instance, the dictator can spot-reproduce at any point by merely letting up on the rotational force of the knob 50 sufficiently only to hold the switch 96 operated without restraining the normal forward drive of the carriage by the feed screw.

It is particularly desirable in connection with the present simplified control system wherein separate control buttons are used always for recording and repoducing, that it be possible to lock each of these buttons in operated position so that the dictator need not continue to hold the respective buttons down during any long run of continuous use of the machine for recording or reproducing. Locking of the buttons is easily achieved by providing each button with an inset lip 122 at its free end which is moved below the wall of the handpiece when the button is depressed and by providing each button with a shiftable pivot 123 so that the button can be shifted towards the head of the handpiece when it is in a depressed position to lock the lip under the housing wall, all as is clearly illustrated in Figure 2.

An adverse result, however, of enabling the dictator to lock the respective start-stop buttons in start position is that he may inadvertently forget to unlock one button before he proceeds to press the other to have the machine accomplish the function controlled by the other button. In order to safeguard against such and other possible misoperation of the machine, with possible resultant failure of the machine to record or reproduce the spoken dictation, I provide a signaling system which will positively warn the dictator whenever he attempts to do anything in the control or operation of the machine that is incorrect. This warning is obtained from a single buzzer 130 under all condition of possible misoperation of the machine, a buzzer being preferably employed since a sound warning is the most effective form of signaling. The energizing circuits for the buzzer are led preferably from a midpoint 131 of the rectifier 101 to the negative terminal 102.

When both of the star-stop buttons are held in operated position, the buzzer is activated from the point 131 via lower contact of switch 84, switch 82 and negative terminal 102. If the dictator records to the end of the recordable range on the record, the buzzer is activated from the terminal 131 via the buzzer, lower contact of record end switch 89, upper contact of switch 84 and switch 82 to negative terminal 102. Also, whenever the dictator presses the record button 80 to backspace the carriage while the machine is in reproducing condition, the buzzer is activated from the point 131 via the buzzer, upper contact of switch 107 (in view of the lift rod 44 being now in its intermediate-reproduce position), upper contact of record end switch 89, upper contact of reproduce switch 84, record switch 82 and negative terminal 102. If the carriage is at the end of the recording range, the record end switch 89 shunts the switch 107 via the upper contact of the latter to maintain the buzzer operated simply by a partially-different circuit.

Additionally, the buzzer is activated whenever the record start button is pressed while the carriage is in its recordable range and any of the following occur: (1) the cover 16 is open, (2) the record clamp is not engaged, and (3) the turntable is free of a record independently of whether the record clamp is engaged or not. As before described, each of these conditions results in the lift rod 44 being held in its uppermost position, whether or not the control knob 50 is in record or reproduce position, to cause the switch 107 to make with its upper contact. When the record start button is pressed under these conditions the activating circuit for the buzzer is completed from the terminal 131 via the buzzer, upper contact of switch 107, upper contact of record end switch 89, upper contact of reproduce switch 84, record switch 82 and negative terminal 102.

A further effect of the lift rod 44 being held in its uppermost position is that the clutch is disabled by the switch 87 being then held open. This assures that the record disk cannot be rotated, whether or not the record or reproduce button is held or locked in operated position, while a record is being removed from and replaced on the turntable. This is a safety feature to safeguard the user against having his hand possibly cut by the edge of the record disk during the removal of the disk from the machine.

The embodiment of my invention hereinabove particularly shown and described is intended to be illustrative and not limitative of my invention since the same is subject to changes and modifications without departure from the scope of my invention, which I endeavor to express according to the following claims.

I claim:

1. In a dictating machine including a support for a record, record-cooperable translating means adapted for recording and reproducing, and drive means for providing a relative scanning movement between the support and translating means: the combination of an audio system including said translating means and conditionable selectively for recording and reproducing; means for placing said audio system into recording condition; a start-stop drive control member for recording; a start-stop drive control member for reproducing; means for placing said audio system in reproducing condition when said reproduce control member is operated; a warning device; and means responsive to operation of both of said start-stop control members for activating said warning device.

2. In a dictating machine including a support for a record, record-cooperable translating means adapted for recording and reproducing, and drive means for providing a relative scanning movement between the support and translating means: the combination of an audio system including said translating means and conditionable selectively for recording and reproducing; a shiftable record-reproduce control means for placing said audio system into record and reproduce conditions; a start-stop drive control member for recording; a separate start-stop drive control member for reproducing; a warning device; and means for activating said warning device upon said record start-stop control member being moved to start position when said shiftable conditioning means is in reproduce position.

3. The combination set forth in claim 2 including means recurrently activatable to backspace said translating means relative to the record; and means for activating said backspacing means by said record start-stop control member upon moving said control member to start position while said shiftable conditioning means is in reproduce position.

4. In a dictating machine including a support for a record, record-cooperable translating means adapted for recording and reproducing, and drive means for providing a relative scanning movement between the support and translating means: the combination of an audio system including said translating means and conditionable selectively for recording and reproducing; a shiftable record-reproduce control means for placing said audio system into record and reproduce conditions; a start-stop drive control member for recording; a separate start-stop drive control member for reproducing; a warning device; and means for activating said warning device upon the occurrence of each of the following: (1) both of said start-stop control members are moved to start position independently of the positioning of said shiftable conditioning means, and (2) said record start-stop control member is moved to start position when said shiftable conditioning means is in reproduce position.

5. In a dictating machine including a movable support for a record, separate record and reproduce translating devices, drive means for producing a relative scanning movement between the record and translating devices with the reproducing device being at a trailing distance behind the recording device: the combination of a handpiece including a receiver-microphone transducer means and separate drive control members for recording and reproducing; an audio system including said translating devices and transducer means; a selector means in said audio system shiftable into record and reproduce positions to condition the system respectively for recording and reproducing; means for placing said audio system into reproduce condition upon moving said reproduce start-stop control to start position while the selector means is in record position; a warning device; and means responsive to moving said record start-stop control to start position while said selector means is in reproduce position for activating said warning device.

6. In a dictating machine including a movable support for a record, separate record and reproduce translating devices, drive means for producing a relative scanning movement between the record and translating devices with the reproducing device being at a trailing distance behind the recording device: the combination of a handpiece including a receiver-microphone transducer means and separate drive control members for recording and reproducing; an audio system including said translating devices and transducer means; a selector means in said audio system shiftable into record and reproduce positions to condition the system respectively for recording and reproducing; a sound warning device; means for activating said warning device upon said record translating device reaching an end of the recordable area of the record while said selector means is in record position and said record start-stop control is in start position; means for causing said reproducing device to scan to said end of the record without activation of said warning device by moving said reproduce start-stop control to start position and said selector means to reproduce position; and means responsive to said reproducing device reaching said end of the record for stopping said drive means.

7. In a dictating machine including a movable support for a record, a record-cooperable recording head and a drive means for producing a scanning movement of said head relative to a supported record: the combination of a start-stop control means for said drive means; means for selectively conditioning said machine for operation on a supported record and for a change of record on said support; a sound warning device; and means responsive to said start-stop control as the same is moved to start position while said machine is conditioned for a change of record for activating said warning device.

8. In a dictating machine including a support for a record, record-cooperable translating means adapted for recording and reproducing, and drive means for providing a relative scanning movement between the support and translating means: the combination of an audio system including said translating means and conditionable selectively for recording and reproducing; a shiftable record-reproduce control means for placing said audio system into record and reproduce conditions; a start-stop drive control member for reproducing; a warning device; means selectively operable either to place the machine in condition for operation on a supported record or in position for a change of record on said support; and means operative upon said machine being conditioned for a change of record, said start-stop reproducing control being in stop position and said start-stop record control being in record position for activating said warning device.

9. In a dictating machine including a support for a record, record-cooperable translating means adapted for recording and reproducing, and drive means for providing a relative scanning movement between the support and translating means: the combination of an audio system including said translating means and conditionable selectively for recording and reproducing; a shiftable record-reproduce control means for placing said audio system into record and reproduce conditions; a start-stop drive control member for recording; a separate start-stop drive control member for reproducing; a warning device; a closure member movable into open position to permit a change of record on said support; record-detecting means differently operated according to whether or not a record is secured to said support; and means for activating said warning device upon said shiftable conditioning means being in record position, said record start-stop control being in start position and either of the following conditions being present: (1) said closure member being open, or (2) said record-detecting means being in a position indicating absence of a record on said support.

10. In a dictating machine including a movable support for a record, a record-cooperable reproducing means, and drive means for rotating said support and for producing a progressive traveling movement between the support and reproducing means: the combination of manual means for shifting said reproducing means and record support relative to each other in the path of said traveling movement; means for starting rotation of said support; and means responsive to an operating force applied to said manual means of a magnitude less than that required to produce a shifting movement between the translating means and record support for operating said starting means.

11. In a dictating machine: the combination of a rotatable record support, a record-cooperable translating means; drive means for concurrently rotating said support and producing a relative traveling movement between the support and translating means; means for manually shifting said translating means and record support relative to each other in the path of their relative traveling movement; and means controlled by said manual means for causing said support to be rotated while said translating means is being shifted relative to said support.

12. In a dictating machine including a movable record support, a record-cooperable translating means selectively operable as a recorder or reproducer, and drive means for rotating said support and concurrently producing a relative traveling movement between the support and translating means: the combination of means for selectively conditioning said translating means for recording and reproducing; means rendered operative by said conditioning means as the same is moved to reproduce position for manually shifting said translating means relative to said support in the path of their relative traveling movement; and means responsive to operation of said manual shifting means for starting rotation of said record support.

No references cited.